United States Patent
Miguchi

(10) Patent No.: US 7,988,596 B2
(45) Date of Patent: Aug. 2, 2011

(54) VEHICLE AND FOUR WHEELED VEHICLE FOR IRREGULAR GROUND

(75) Inventor: Akio Miguchi, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 758 days.

(21) Appl. No.: 12/071,045

(22) Filed: Feb. 14, 2008

(65) Prior Publication Data

US 2008/0280729 A1    Nov. 13, 2008

(30) Foreign Application Priority Data

Feb. 14, 2007  (JP) ................ P2007-033539

(51) Int. Cl.
*B60W 10/04*  (2006.01)
*B60W 10/02*  (2006.01)
(52) U.S. Cl. .................... 477/110; 477/181
(58) Field of Classification Search .......... 477/44, 477/107, 110, 111, 175, 181
See application file for complete search history.

(56) References Cited

U.S. PATENT DOCUMENTS

| | | | |
|---|---|---|---|
| 6,561,948 B2 * | 5/2003 | Markyvech et al. | 477/77 |
| 6,571,904 B2 * | 6/2003 | Izumi | 180/366 |
| 6,620,076 B1 * | 9/2003 | Kawamura et al. | 477/107 |
| 6,633,806 B2 * | 10/2003 | Gochenour | 701/51 |
| 6,641,504 B2 * | 11/2003 | Genise et al. | 477/107 |
| 7,048,670 B2 * | 5/2006 | Isoda et al. | 477/107 |
| 7,171,942 B2 * | 2/2007 | Nickel | 123/335 |
| 7,819,037 B2 * | 10/2010 | Hiroi et al. | 74/335 |

FOREIGN PATENT DOCUMENTS

| | | |
|---|---|---|
| JP | 7-103009 | 4/1995 |
| JP | 11-17339 | 1/1999 |

\* cited by examiner

*Primary Examiner* — Roger Pang
(74) *Attorney, Agent, or Firm* — Wenderoth, Lind & Ponack L.L.P.

(57) ABSTRACT

A vehicle includes a first detecting means for detecting an engine speed, a second detecting means for detecting a rotational speed of a rotating member, an engine speed changing means for changing the engine speed, and a control unit. The control unit is electrically connected to the first detecting means, the second detecting means, and the engine speed changing means and controls the engine speed changing means when the rotational speed of the rotating member detected by the second detecting means is lower than a set rotational speed previously set in a range from zero to a rotational speed of the rotating member during rotation of the engine in a range between a speed more than an idle rotational speed and a speed less than a predetermined maximum limit rotational speed.

20 Claims, 10 Drawing Sheets

VEHICLE AND FOUR WHEELED VEHICLE FOR IRREGULAR GROUND

BACKGROUND OF THE INVENTION

1. Field of the Invention

The present invention relates generally to a vehicle which has a clutch device arranged in a power transmission path between an engine and wheels, and which changes from a partial clutch engagement state to a complete connection state when the engine speed is increased to a predetermined engage rotational speed of the clutch device. In particular, the present invention is suitable for a four wheeled utility vehicle for irregular ground.

2. Description of the Prior Art

As a vehicle for running on irregular ground, there is a straddle-type all-terrain vehicle referred to as ATV and disclosed in Japanese Unexamined Patent Publication No. 11-17339, a seating-type four wheeled utility vehicle having a loading space, a straddle-type three wheeled vehicle, and an off-road motorcycle. As a clutch device mounted on the vehicles, there are a variable-speed V-belt drive having a clutch function and a centrifugal clutch device.

The vehicle for irregular ground is used for running on irregular ground such as fields, slopes, rough ground, marshes, or sandy beaches. The vehicle is therefore frequently accelerated or decelerated and started or stopped. The vehicle also often becomes stuck due to its wheel falling into a ditch or a depression.

Many riders try to get the vehicle out of the stuck state by excessively opening the throttle. Upon acceleration in the state in which the driving wheel is locked, however, in a vehicle having the variable-speed V-belt drive having a clutch function for example, the driving pulley is forcefully rotated with respect to the driven pulley in a substantially stopped state in the variable-speed V-belt drive having a clutch function. In this state, the V-belt and the driving pulley abruptly rub against each other, resulting in early wear locally caused on the V-belt. The wear locally caused on the V-belt causes the V-belt to become wavy during driving, resulting in the lowering of power transmission efficiency, whereby abnormal noise can be caused. In a vehicle having the centrifugal clutch device, burning is caused in frictional force generated sections such as a friction surface.

At present, measures for strengthening the protecting function of the clutch device of the vehicle for irregular ground are not particularly made. Such a vehicle for irregular ground is however required which protects the clutch device from the early wear on the V-belt or burning in the frictional force causing sections, and which exhibits sufficient pulling force.

SUMMARY OF THE INVENTION

The present invention addresses the above described condition, and an object of the present invention is to provide a vehicle or four wheeled vehicle for irregular ground, capable of protecting a clutch device from early wear on a V-belt or burning in a frictional force causing section, and capable of exhibiting sufficient pulling force.

In order to accomplish the foregoing object of the present invention, there is in accordance with the present invention provided a vehicle which has a clutch device arranged in a power transmission path between an engine and wheels and changed from a partial clutch engagement state to a complete connection state when an engine speed is increased to a predetermined engage rotational speed of the clutch device, the vehicle including: a first detecting means for detecting the engine speed; a second detecting means for detecting a rotational speed of a rotating member arranged on a power downstream side from a power intermittent section of the clutch device and rotated by output power of the clutch device; an engine speed changing means for changing the engine speed; and a control means electrically connected to the first detecting means, the second detecting means, and the engine speed changing means and for controlling the engine speed changing means such that when the rotational speed of the rotating member detected by the second detecting means is lower than a set rotational speed previously set in a range from zero to a rotational speed of the rotating member during rotation of the engine at a engage speed of the engine, the engine speed does not an exceed limit rotational speed previously set in a range between a speed more than an idle rotational speed and a speed less than a predetermined maximum limit rotational speed.

With this configuration, in the event that the vehicle falls into a stuck state and the rider excessively opens the throttle by excessive throttle operation, the engine speed is controlled within a range not exceeding the limit rotational speed previously set in a range between a speed more than an idle rotational speed and a speed less than a predetermined maximum limit rotational speed. The limit rotational speed is a rotational speed such that rotary torque is sufficiently transmitted. The variable-speed V-belt drive having a clutch function can therefore produce sufficient pulling force and can prevent early wear locally caused on the V-belt and abnormal noise caused thereby. The centrifugal clutch device can also produce sufficient pulling force while preventing burning in the frictional force causing sections.

Preferably, the predetermined maximum limit rotational speed may be a substantially maximum torque rotational speed in which torque capable of being produced by the engine becomes maximum value.

With this configuration, the power transmission efficiency from the engine to the power downstream side of the clutch device can be maintained high.

Preferably, the engine speed does not exceed the limit rotational speed previously set in a range between the engage rotational speed or more and the speed less than the substantially maximum torque rotational speed.

Preferably, control start timing of the engine speed changing means by the control means may be set when the state in which the rotating member is rotated at or below the set rotational speed or stopped is continued for a predetermined time.

With this configuration, when the wheel is not in a stuck state and is stopped or rotated at a low speed instantly or for a very short time, the engine speed is not limited to or below the limit rotational speed. Smooth running can therefore be maintained.

Preferably, as the clutch device, a variable-speed V-belt drive having a clutch function or a centrifugal clutch device may be used.

Preferably, on controlling the engine speed changing means by the control means, when the engine speed is decreased by a fixed rate when exceeding the limit rotational speed and the rotational speed of the rotating member then exceeds the set rotational speed, the engine speed may be increased by a fixed rate.

Preferably, the vehicle may be a four wheeled vehicle for irregular ground.

Preferably, the four wheeled vehicle for irregular ground may be capable of being driven on a four-wheel-drive.

The probability of the driving wheel being locked is increased in the case of the four wheeled vehicle; however, the above-described four wheeled vehicle of the four-wheel-drive type can reduce loads on the V-belt and the like.

Preferably, the second detecting means of the four wheeled vehicle for irregular ground may be a detecting means for detecting a rotational speed of a rotating member which is arranged on the power transmission path and transmits a force of the engine to both front and rear wheels.

With this configuration, irrespective of the stuck phenomenon of a front wheel or a rear wheel, the rotational speed of the propeller shaft can be detected.

Preferably, the four wheeled vehicle for irregular ground further may include a gear type transmission, the gear type transmission in a neutral state allowing the engine speed to exceed the limit rotational speed.

Preferably, the engine speed changing means is an ignition device for changing the engine speed by retarding ignition timing.

With this configuration, a response of the control means for changing the speed of the engine will be improved

BRIEF DESCRIPTION OF THE DRAWINGS

The above and other objects, features and advantages of the present invention will become more apparent from the following description taken in connection with the accompanying drawings, in which.

DETAILED DESCRIPTION OF THE INVENTION

First Embodiment

FIGS. 1 to 7 show a straddle-type four wheeled vehicle for irregular ground according an embodiment of the present invention, and the embodiment of the present invention will be described below based on these drawings.
(The Overall Configuration of the Vehicle)

Figure 1:
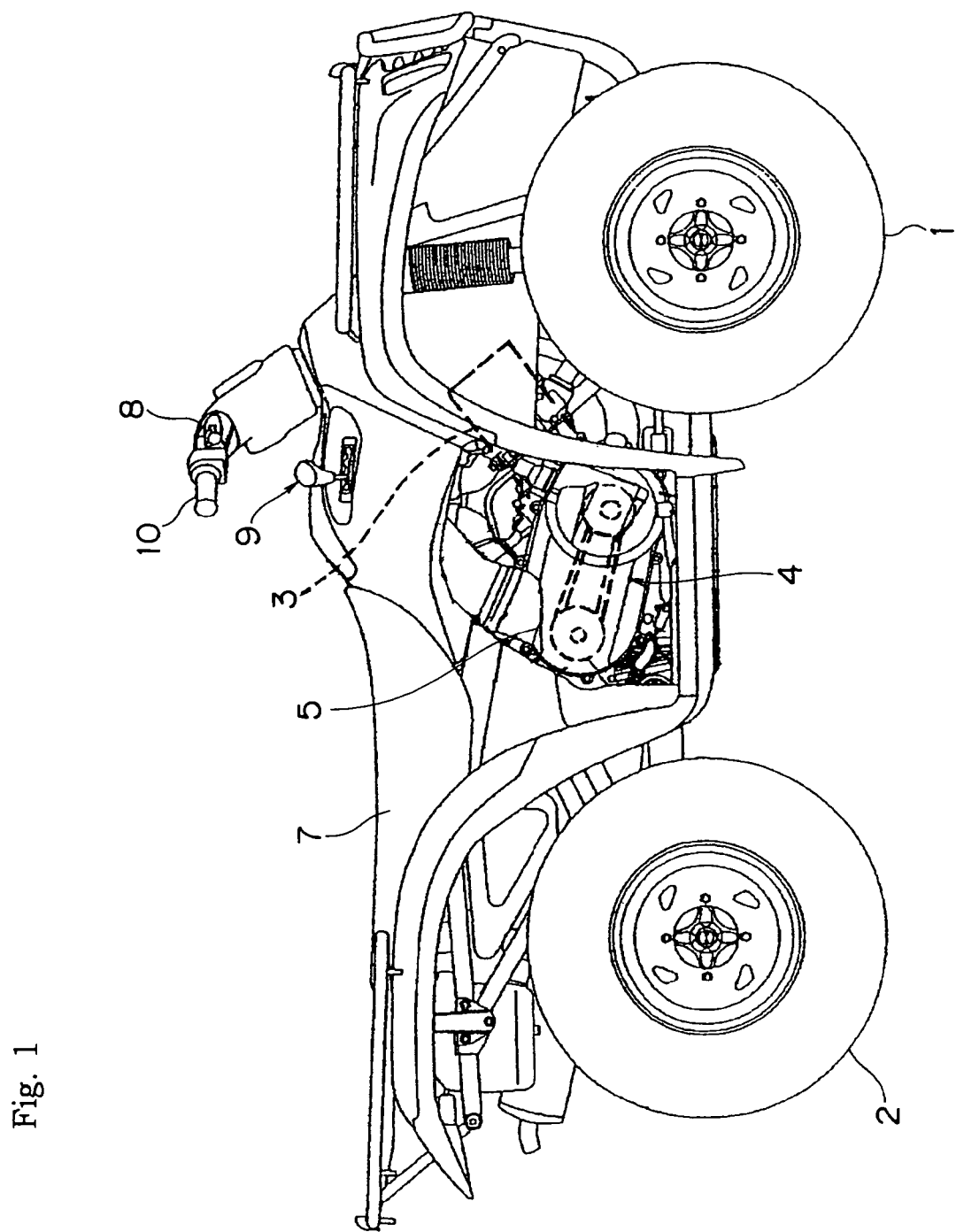
FIG. 1 is a right side view of a straddle-type four wheeled vehicle for irregular ground according to a first embodiment of the present invention.

FIG. 1 is a right side view of a straddle-type four wheeled vehicle for irregular ground. The vehicle has a pair of right and left front wheels 1 and a pair of right and left rear wheels 2. An engine (V-type engine) 3, a variable-speed V-belt drive having a clutch function 4, a gear type auxiliary transmission 5, and the like are arranged in a space between the front wheels 1 and the rear wheels 2. The vehicle has a straddle-type seat 7 and a bar type handle 8 in its upper portion. A throttle lever (accelerator lever), not shown, is provided near a right end grip 10 of the handle 8. A shift lever device 9 is provided below the right end grip 10.

Figure 2:
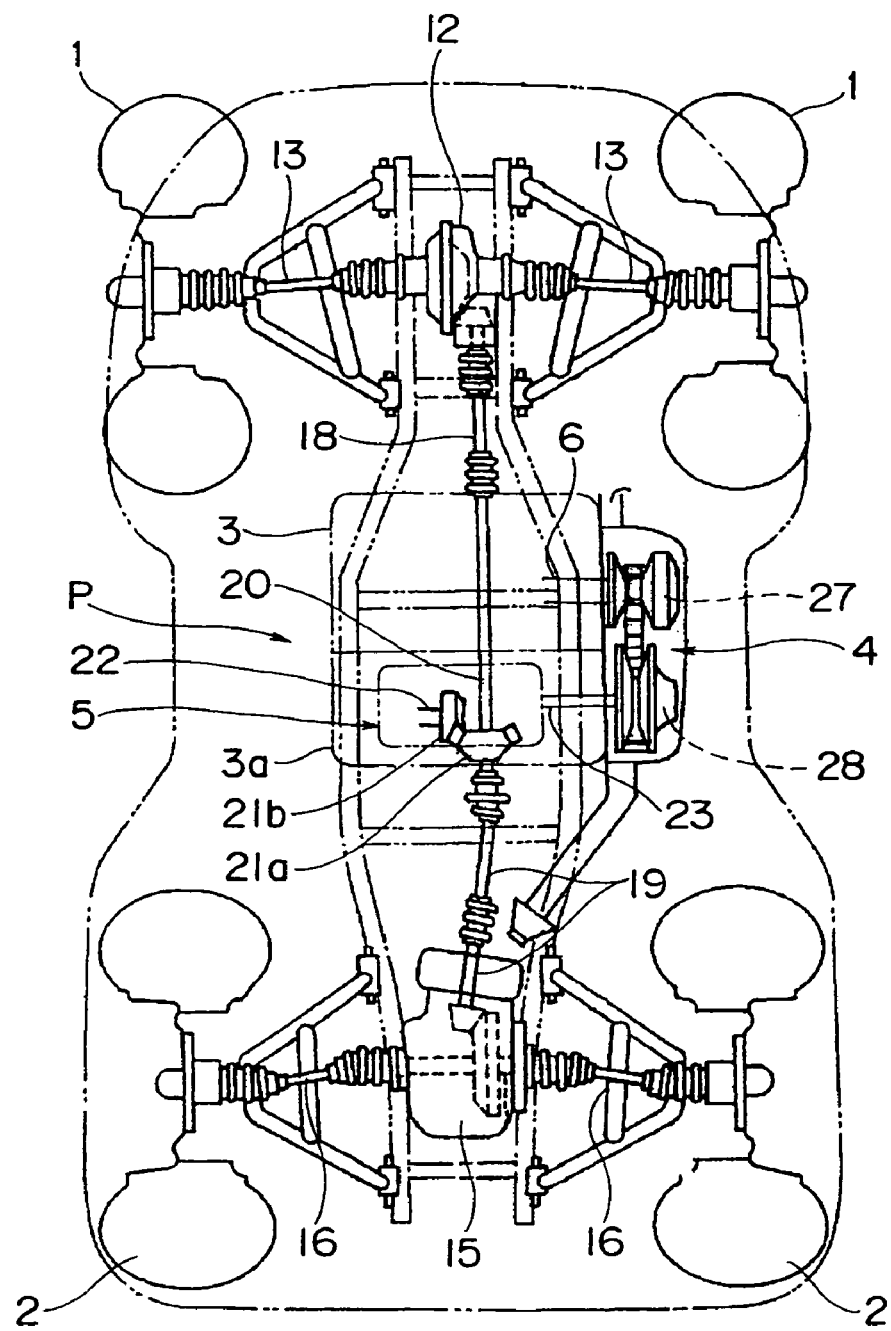
FIG. 2 is a plan view of a power transmission path of the straddle-type four wheeled vehicle for irregular ground of FIG. 1.

FIG. 2 is a plan view showing a power transmission path of the straddle-type four wheeled vehicle for irregular ground. The gear type auxiliary transmission 5 is housed in a transmission case 3a formed in the rear portion of the crankcase of the engine 3. The variable-speed V-belt drive having a clutch function 4 is arranged from the right side surface of the engine 3 to the right side surface of the gear type auxiliary transmission 5.

A differential gear for front wheels 12 is arranged between the right and left front wheels 1. The right and left output shaft sections of the differential gear for front wheels 12 are coupled to front axels of the front wheels 1 via constant-velocity universal joints and front-wheel driving shafts 13. A final reduction gear for rear wheels 15 is arranged between the right and left rear wheels 2. The right and left output shaft sections of the final reduction gear for rear wheels 15 are coupled to rear axels of the rear wheels 2 via constant-velocity universal joints and rear-wheel driving shafts 16.

Input sections of the differential gear for front wheels 12 and the final reduction gear for rear wheels 15 are coupled to a propeller shaft for front wheels 18 and a propeller shaft for rear wheels 19, respectively, so as to transmit power. Both the propeller shafts 18 and 19 are coupled to the front and rear ends of a main propeller shaft 20 arranged on the lower side of the engine 3 so as to transmit power. The main propeller shaft 20 is coupled to a transmission output shaft 22 of the gear type transmission 5 via bevel gears 21a and 21b so as to transmit power.

A transmission input shaft 23 of the gear type transmission 5 is formed integrally with a driven shaft 28 of the variable-speed V-belt drive 4. A driving shaft 27 of the variable-speed V-belt drive 4 is coupled to a crankshaft 6 of the engine 3 so as to transmit power.

Figure 3:
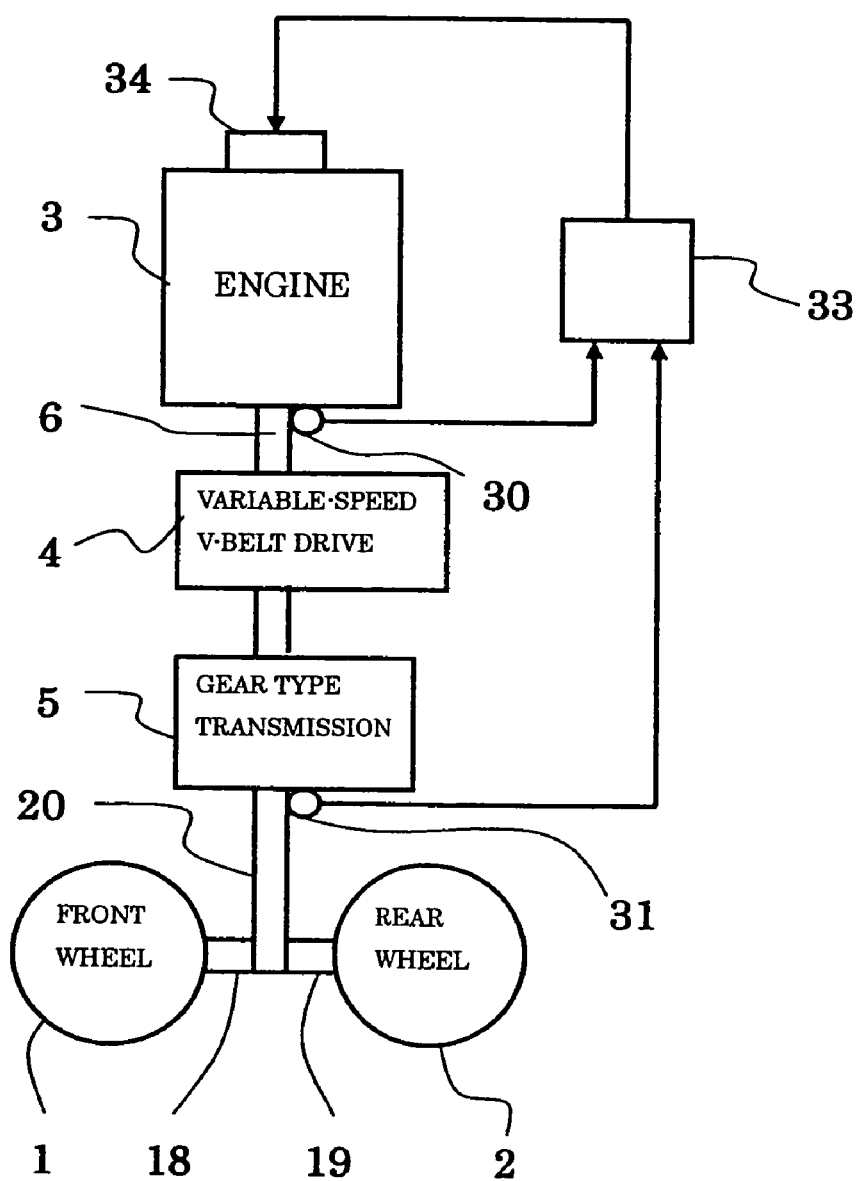
FIG. 3 is a block diagram of the power transmission path of the straddle-type four wheeled vehicle for irregular ground of FIG. 1.

FIG. 3 is a simplified block diagram showing the power transmission path of the straddle-type four wheeled vehicle for irregular ground and is a diagram showing a controller. An engine speed detecting device (an example of an engine speed detecting means) 30 for detecting rotational speeds of the crankshaft 6 of the engine 3 and a power downstream side rotational speed detecting device 31 for detecting rotational speeds of the main propeller shaft 20 are arranged in the power transmission path from the engine 3 to the front wheel 1 and the rear wheel 2. Both the detecting devices 30 and 31 are electrically connected to the input section of a control unit (control means) 33 incorporating a CPU, a storage device, and the like. The output section of the control unit 33 is electrically connected to an engine speed control circuit of an ignition device 34. The ignition device 34 is operated as an engine speed changing means by a control signal from the control unit 33 to an ignition device 35 and changes ignition timing, e.g., by retarding it at an angle to limit the engine speed.
(The Configuration of the Variable-Speed V-Belt Drive)

Figure 4:
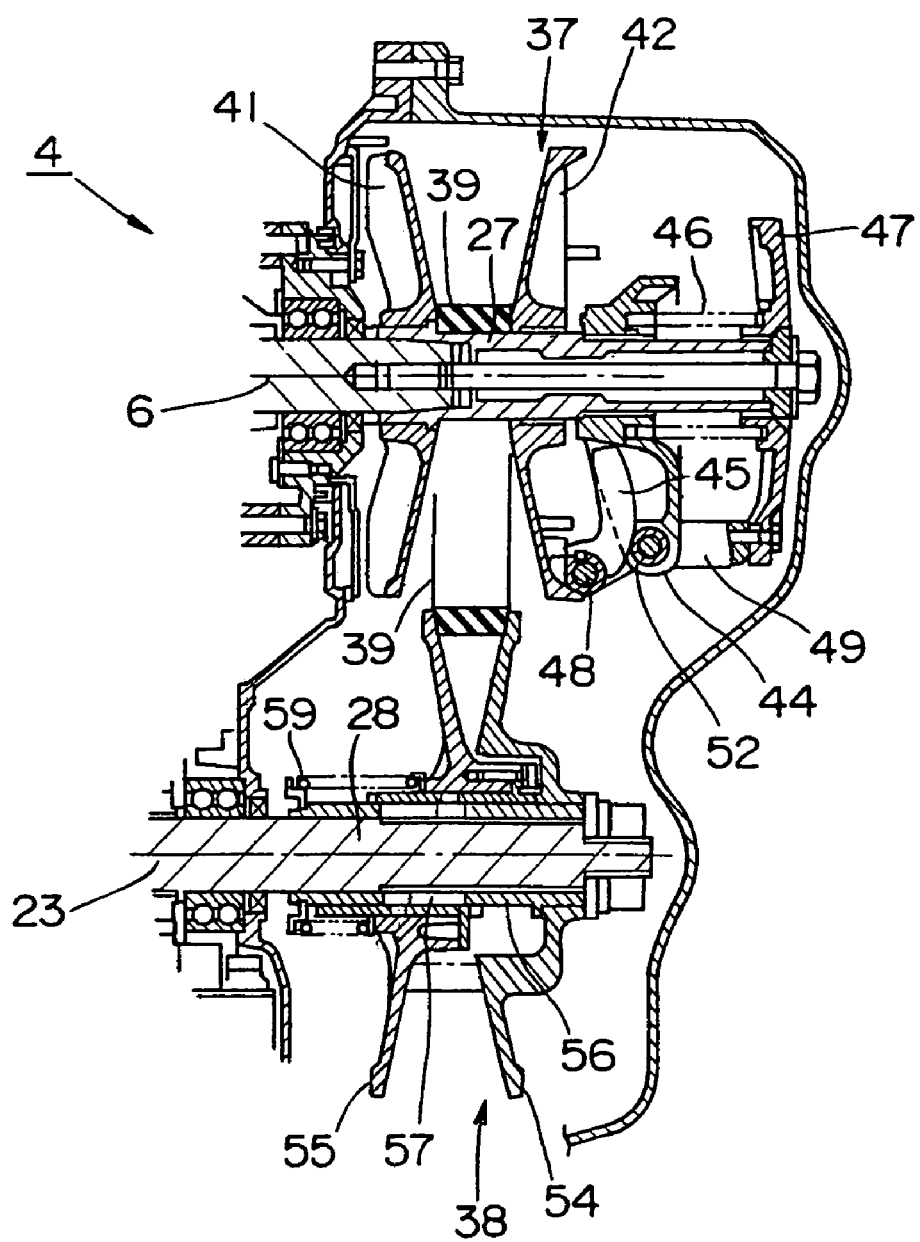
FIG. 4 is a cross-sectional view of a variable-speed V-belt drive having a clutch function of the straddle-type four wheeled vehicle for irregular ground of FIG. 1.

FIG. 4 is a cross-sectional view of the variable-speed V-belt drive having a clutch function 4 taken along a plane passing through the driving shaft 27 and the driven shaft 28. The variable-speed V-belt drive 4 has a driving pulley 37 provided on the driving shaft 27, a driven pulley 38 provided on the driven shaft 28, and a V-belt 39 entrained around both the pulleys 37 and 38. The state of the driving pulley 37 of FIG. 4 shows the state in which the V-belt 39 is not clamped and power is stopped, that is, the clutch-off state. The state of the upper half portion of the driven pulley 38 of FIG. 4 shows the clutch-off state (or the maximum deceleration state) corresponding to said state of the driving pulley 37. The state of the lower half portion of the driven pulley 38 of FIG. 4 shows the minimum speed reducing ratio state on the highest side.

The driving pulley 37 has a left stationary sheave 41 and a right movable sheave 42. The stationary sheave 41 is fixed to the driving shaft 27 so as not to be rotated relative to the driving shaft 27 and not to be moved in the axial direction of the driving shaft 27. The movable sheave 42 is integrally rotatably engaged with the driving shaft 27 via a spider 44 in the rotation direction and is movably fitted on the driving shaft 27 in the axial direction.

A driving pulley thrust force generation mechanism having the spider 44, a plurality of governor weights (flyweight governor weights) 45, a pressure adjusting spring 46, a support panel 47, and the like are provided on the rear surface side (right side) of the movable sheave 42. The governor weights 45 are rotatably supported by a plurality of pins 48 provided on the rear surface of the movable sheave 42 and are rotated about the pins 48 rightward by centrifugal force with the increase of rotational speed of the crankshaft 6 and the driving shaft 27. A coupling arm 49 passing through the spider 44 so as to be extended rightward is formed on the rear surface of the movable sheave 42. A right edge of the coupling arm 49 is coupled to the support panel 47. The support panel 47 is fitted on the driving shaft 27 so as to be moved in the axial direction and rotated relative to the driving shaft 27.

The spider 44 is screwed to the driving shaft 27 and has a pressure receiving roller 52 that the governor weights 45 abut on. The pressure adjusting spring 46 is contracted between the spider 44 and the support panel 47 and biases the support panel 47 rightward to indirectly bias the movable sheave 42 rightward via the coupling arm 49. That is, the pressure adjusting spring 46 biases the movable sheave 42 in the direction opened between the sheaves 41 and 42 of the driving pulley 37. When the engine speed is increased to rotate the governor weights 45 rightward, the movable sheave 42 is moved leftward with the support panel 47 against the pressure adjusting spring 46 by reaction force of the pressure receiving roller 52. With this movement, the driving pulley 37 is changed from the clutch-off state through the partial clutch engagement state to the clutch-on state in which the V-belt 39 is strongly nipped between both the sheaves 41 and 42. Further, the effective entraining radius is increased to change the gear ratio to the high side.

Figure 5:
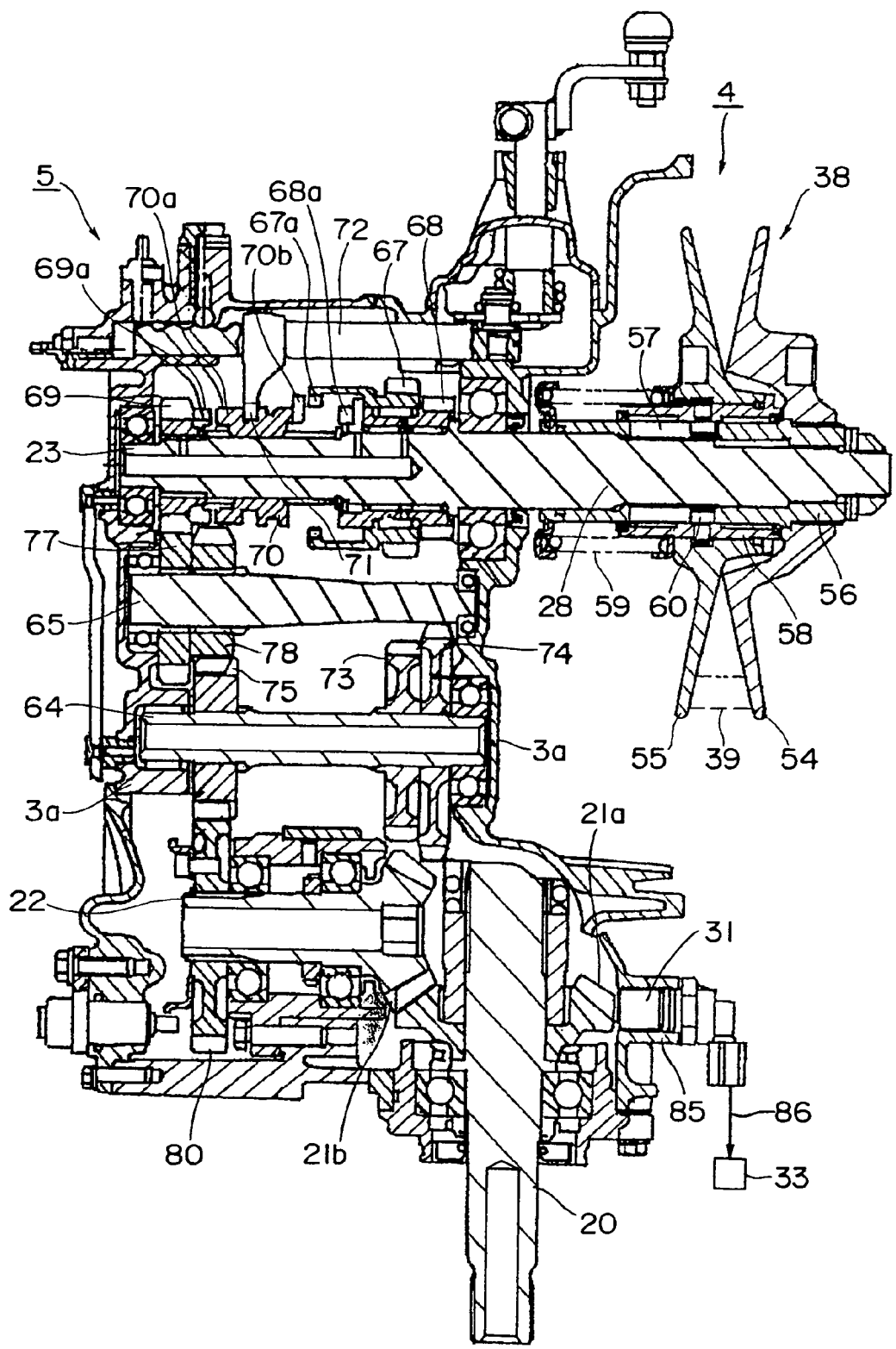
FIG. 5 is a cross-sectional view of a gear type transmission of the straddle-type four wheeled vehicle for irregular ground of FIG. 1.

FIG. 5 is an enlarged cross-sectional view of the driven pulley 38 and the gear type transmission 5. The driven pulley 38 has a right stationary sheave 54 and a left movable sheave 55. The stationary sheave 54 is fixed to a cylindrical camshaft 56 fixed to the driven shaft 28 so as not to be moved in the axial direction and not to be rotated relative to the cylindrical camshaft 56. A plurality of helical cam guide grooves 57 are formed in the camshaft 56. A sleeve 58 is fixed to the inner peripheral end of the movable sheave 55 and is fitted on the camshaft 56 so as to be moved in the axial direction and rotated relative to the cam shaft 56. The movable sheave 55 is biased to the stationary sheave side (rightward) by a pressure adjusting spring 59. A cam roller 60 supported by the sleeve 58 is engaged with the cam guide grooves 57 so as to slide in the axial direction.

That is, the tension of the V-belt 39 is increased to open the movable sheave 55 leftward against the pressure adjusting spring 59, so that the gear ratio is changed to a high side. When the rotary torque from the V-belt 39 is increased to twist the movable sheave 55 forward in the rotation direction relative to the stationary sheave 54, the movable sheave 55 is pushed to the stationary sheave side by the cam action of the cam roller 60 and the cam guide grooves 57 to increase the nipping pressure.

(Gear Type Transmission)

In FIG. 5, the gear type transmission 5 incorporated in the transmission case 3a can be switched or shifted among a forward high speed position, a forward low speed position, a neutral position, and a backward position, and has, as shifting shafts, the transmission input shaft 23, the transmission output shaft 22, a counter shaft 64, an idle shaft for backward motion 65, and a shift rod 72 in parallel with one another.

A gear for forward high speed 67 and a gear for forward low speed 68 are arranged in parallel with each other at a right end of the transmission input shaft 23 in the transmission case 3a. A gear for backward 69 is arranged at a left end of the transmission input shaft 23. A shift sleeve 70 is spline-fitted on a center portion of the transmission input shaft 23 so as to be moved in the axial direction.

The gear 69 for backward is rotatably fitted on the transmission input shaft 23 via a needle bearing and has a dog claw 69a extended rightward. The dog claw 69a can be engaged with a dog claw 70a for backward formed at a left end of the shift sleeve 70. The gear 68 for forward low speed is rotatably fitted on the transmission input shaft 23 via a needle bearing and has a dog claw 68a at a left edge of the boss portion extended leftward. The dog claw 68a can be engaged with a dog claw 70b for forward formed at a right end of the shift sleeve 70. The gear 67 for forward high speed 67 is rotatably fitted on an outer periphery of a boss portion of the gear 68 for forward low speed and has an inward dog claw 67a at a left end of an arm portion extended leftward. The dog claw 67a can be engaged with the dog claw 70b for forward of the shift sleeve 70.

An interval in the axial direction between both the dog claw 67a for forward high speed and the dog claw 68a for forward low speed is secured to the extent that the dog claw 70a for forward of the sleeve 70 can be brought into the neutral state once.

A shift fork 71 is fitted in an outer peripheral annular groove of the shift sleeve 70. The shift fork 71 is fixed to the shift rod 72. The shift rod 72 is supported by the transmission case 3a so as to be moved in the right and left directions and is coupled to the shift lever device 9 (FIG. 1) via a shift operational force transmission mechanism so as to transmit operational force. A state in which the shift sleeve 70 is moved to a rightmost side so that the dog claw 70b for forward of the shift sleeve 70 is engaged with the dog claw 68a of the gear 68 for forward low speed is a forward low speed position. The shift sleeve 70 is moved leftward from a forward low speed position so as to be sequentially changed to a neutral position, a forward high speed position, and a backward position.

Intermediate gears 73 and 74 for forward engaged with the gear 67 for forward high speed and the gear 68 for forward low speed respectively are fixed to the counter shaft 64. An intermediate output gear 75 is fixed to a left end of the counter shaft 64. A first idle gear 77 for backward engaged with the gear 69 for backward and a second idle gear 78 for backward engaged with the intermediate output gear 75 are fixed to a left end of the idle shaft 65 for backward. The intermediate output gear 75 is engaged with an output gear 80 fixed to a left end of the transmission output shaft 22. As described above, the bevel gear 21*b* is fixed to a right end of the transmission output shaft 22. The bevel gear 21*b* is engaged with a bevel gear 21*a* fixed to the main propeller shaft 20.

(The Arrangement of the Power Downstream Side Rotational Speed Detecting Device)

The power downstream side rotational speed detecting device 31 is screwed to a mounting boss section 85 formed in a right side wall of the transmission case 3*a*, is opposite the bevel gear 21*a* fixed to the main propeller shaft 20 from the outside in the radial direction, and detects the change in a magnetic flux passing through its edge detecting device to generate an electric pulse. A tooth surface of the bevel gear 21*a* is detected to transmit a rotational speed signal according to the number of pulses (or the cycle of pulses) per unit time to the control unit 33 via an electric cable 86.

(The Contents of Control)

The contents of control will be specifically described. In FIG. 3, when the gear type transmission 5 keeps a forward low speed position, the control unit 33 incorporates a program which starts control of ignition timing of the ignition device 31 so that a rotational speed PN of the main propeller shaft 20 detected by the power downstream side rotational speed detecting device 31 is lower than a set rotational speed PN2 previously set in a range from zero to a rotational speed PNe of the main propeller shaft 20 corresponding to an engage rotational speed Ne of the engine 3 and that when the rotational speed PN that is lower than the set rotational speed PN2 is continued for a predetermined time (e.g., several seconds), an engine speed N does not exceed a limit rotational speed N2 (e.g., 3000 rpm) previously set in a range from the engage rotational speed Ne to a substantially maximum torque rotational speed (an example of the predetermined maximum limit rotational speed) Nmax. In this case, the maximum torque rotational speed is a rotational speed of the crankshaft when torque capable of being produced by the engine becomes maximum value. In this specification, the engage rotational speed of the engine is defined as such a speed at which the clutch is changed from a partial clutch engagement state to a complete clutch-on state.

The main propeller shaft 20 is a rotating member on the power downstream side from the power intermittent section of the variable-speed V-belt drive 4 and is typically rotated in proportion to the vehicle speed except when stacking of the vehicle. Depending on the contents of description, the term "the rotational speed PN of the main propeller shaft 20" will be referred to as "vehicle speed V" and the set rotational speed PN2 will be referred to as "set vehicle speed V2".

Figure 6:
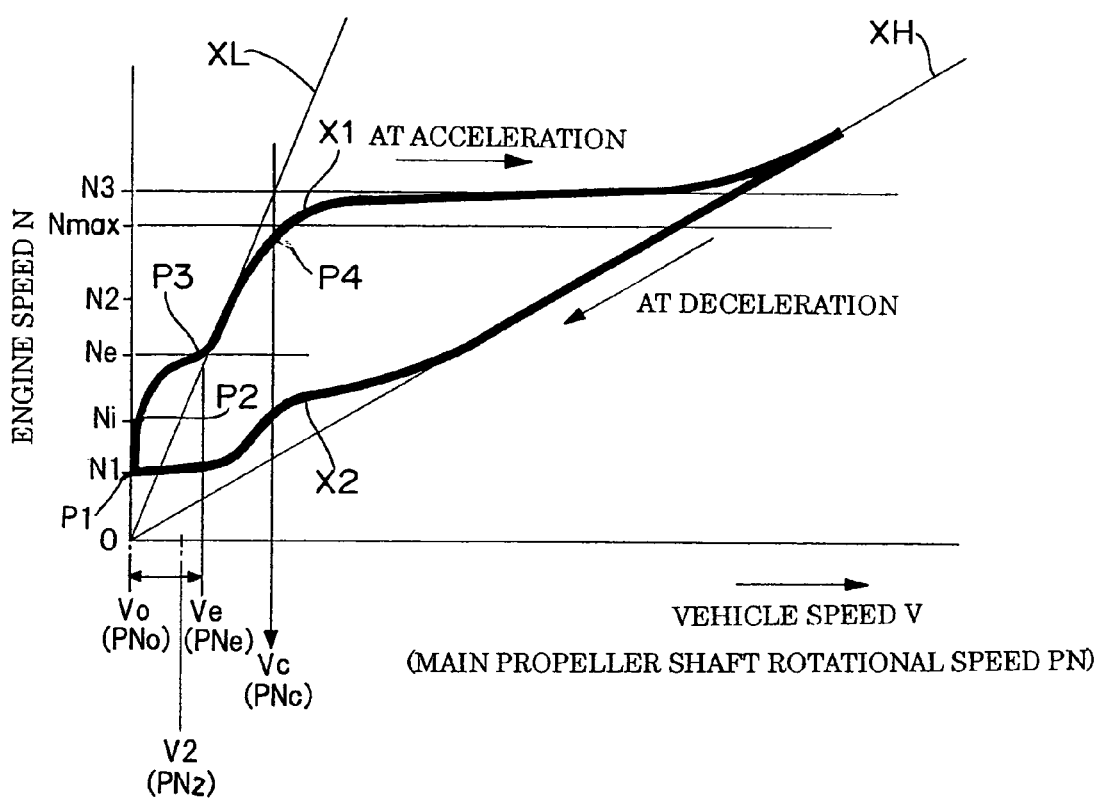
FIG. 6 is a diagram showing shift curves of the variable-speed V-belt drive having a clutch function.

FIG. 6 is a graph in which the vertical axis indicates the engine speed N and the horizontal axis indicates the vehicle speed V (the main propeller shaft rotational speed PN). Thick solid curves X1 and X2 indicate shift curves at acceleration and deceleration in the full throttle state. A straight line XL indicates the theoretical change in speed in the case where the variable-speed V-belt drive 4 is set to the low state (maximum speed reducing ratio state). A straight line XH indicates the theoretical change in speed in the case where the variable-speed V-belt drive 4 is set to the high state (minimum speed reducing ratio state). With respect to the engine rotational speed (crank shaft rotational speed) N, a range between N1 and Ni (N1 or more and Ni or less) indicates an idle rotational speed range, a range between more than Ni and less than Ne indicates a partial clutch engagement range, and Ne indicates the above-mentioned engage rotational speed, e.g., 2000 rpm. Nmax indicates the above-mentioned substantially maximum torque rotational speed, e.g., 5000 to 6000 rpm. N3 indicates the maximum rotational speed at acceleration. In other words, while the engine rotational speed is kept on N3, only the vehicle speed is increasing by a change of the reduction ration of the V-belt drive 4. Shift start speed Vc (main propeller shaft rotational speed PNc) is a change point on the curve X1 at acceleration, in which the driven pulley 38 (FIG. 3) starts to open for starting automatic shift from the low state in which the engine speed N proportional to the vehicle speed V is increased along the low fixing straight line XL.

An idling section exits between a point P1 corresponding to the engine speed N1 and a point P2 corresponding to the engine speed Ni. Therefore, eve if the engine speed N is increased in the idling section, the vehicle speed V is kept zero (V0). The variable-speed V-belt drive 4 is in the partial clutch engagement state between the point P2 and a point P3. In the partial clutch engagement state, part of the power is transmitted to increase the vehicle speed with a gentler inclination than the low fixing straight line XL. The acceleration range in the low state exits between the point P3 and a point P4.

When the gear type transmission 5 keeps a forward low speed position, the set vehicle speed V2 (set rotational speed PN2) which changes ignition timing of the ignition device 34 to limit the engine speed is previously set in a range from a vehicle speed V0 (0) to a vehicle speed Ve corresponding to the engage rotational speed Ne of the engine on the curve X1 at acceleration. When the vehicle speed V is lower than the set vehicle speed V2 and this state is continued for a predetermined time (several seconds), the ignition device 34 limits the engine speed so as not to exceed the limit rotational speed N2 (e.g., 3000 rpm) previously set in a range from the engage rotational speed Ne to the substantially maximum torque rotational speed Nmax. The set vehicle speed V2 is about 5 to 10 km/h.

(Overall Power Transmission)

In FIG. 2, the rotary torque of the crankshaft 6 of the engine 3 is transmitted to the front and rear propeller shafts 18 and 19 via the variable-speed V-belt drive 4, the gear type transmission 5, and the main propeller shaft 20, is transmitted to the rear wheels 2 via the final reduction gear for rear wheels 15 and the rear-wheel driving shafts 16, and is transmitted to the front wheels 1 via the differential gear for front wheels 12 and the front-wheel driving shafts 13.

(Power Transmission of the Variable-Speed V-Belt Drive)

At stop of the engine, as shown in FIG. 4, the governor weights 45 of the driving pulley 37 are closed and the movable sheave 42 is fully opened rightward, which is in the power stop state (clutch-off state).

When the engine is started, the governor weights 45 start to rotate rightward by centrifugal force and the movable sheave 42 is thereby moved leftward. When the engine speed begins to exceed the idling rotation range (from the point P1 to the point P2 of FIG. 6), a V-belt 29 begins to be nipped between both the sheaves 41 and 42 to transmit part of the power in the partial clutch engagement state (from the point P2 to the point P3 of FIG. 6).

The engine speed N is increased from the partial clutch engagement state to reach the engage rotational speed Ne, which is in the complete clutch-on state. The power is transmitted from the driving pulley 37 of FIG. 4 to the driven pulley 38 in the low state at the maximum speed reducing ratio (from the point P3 to the point P4 of FIG. 6).

When the engine speed is increased to exceed the engine speed corresponding to the shift start speed Vc, automatic shift by the variable-speed V-belt drive 4 is begun (after the point P4 of FIG. 6). That is, the width of the driving pulley 37 of FIG. 4 becomes smaller to increase the effective entraining radius, while the width of the driven pulley 38 becomes larger to decrease the effective entraining radius so that the speed reducing ratio is lowered.

(Control at Getting Out of the Stuck State)

Assume that during running, the rear wheels 2 and/or the front wheels 1 fall into a ditch or a depression to be in stuck state, and the front wheels 1 and the rear wheels 2 are in a substantially stopped state, which is continued for a predetermined time. In this case, the control unit 33 of FIG. 3 determines that the vehicle speed V detected by the vehicle speed detecting device (power downstream side rotational speed detecting device) 31 is continued for a predetermined time in the range of the vehicle speed V0 to V1 of FIG. 6, transmits an ignition timing delay signal to the ignition device 34, and controls the engine speed N so as not to exceed the limit rotational speed N2 of FIG. 6. This prevents excessive rotation of the engine 3 and transmits necessary rotary torque in the variable-speed V-belt drive 4, whereby the vehicle escapes the stuck state. That is, while severe rubbing between the V-belt 39 and the driving pulley 37 and thus early wear locally caused on the V-belt 39 can be prevented, necessary torque can be transmitted.

Figure 7:
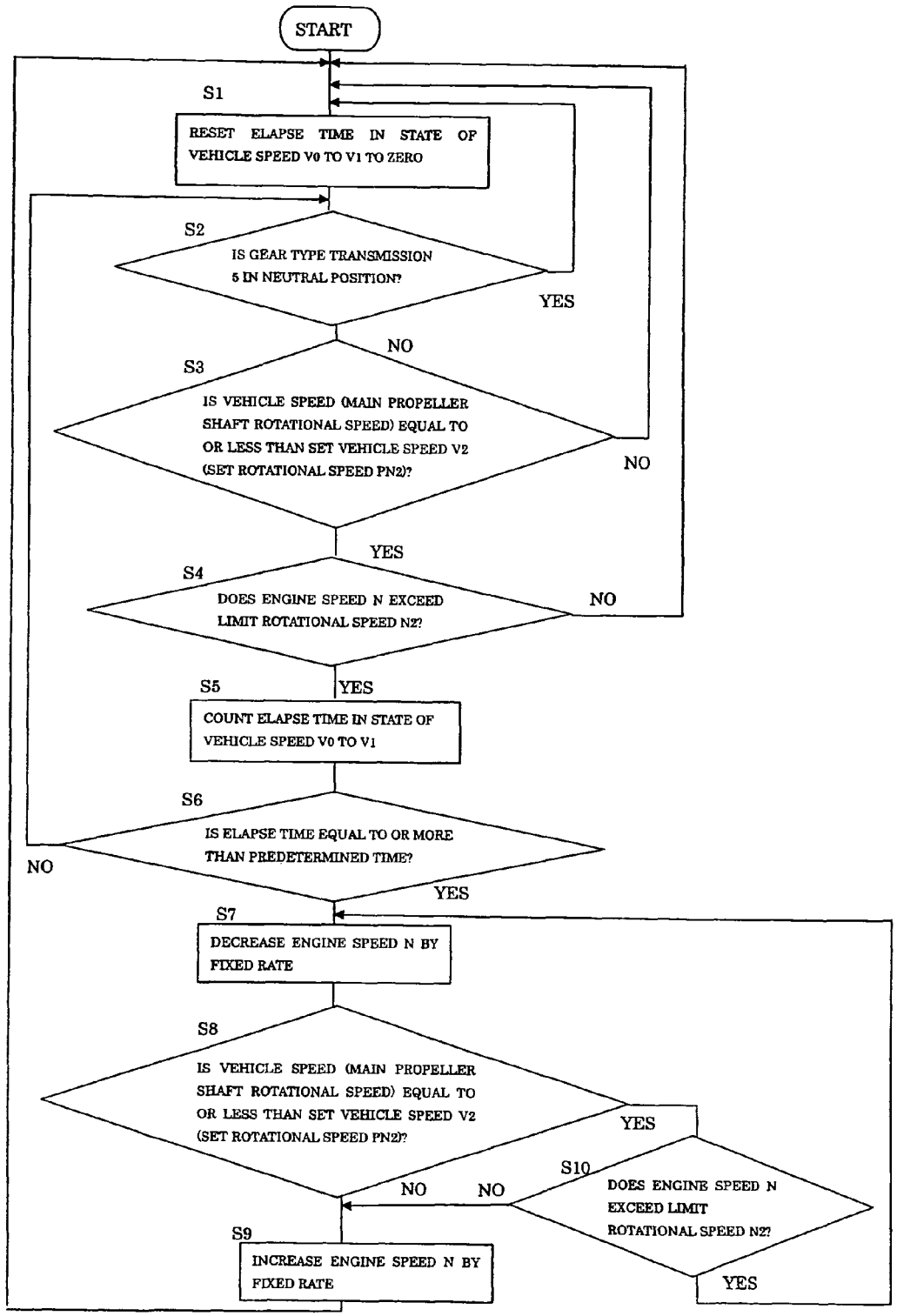
FIG. 7 is a flowchart showing engine speed control according to the present invention.

FIG. 7 is a flowchart of rotational speed control at getting out of the stuck state. A description is given based on the flowchart.

In step S1, an elapse time during detection between the vehicle speed V0 to V1 is reset to zero. The routine is advanced to step S2 to determine whether or not the gear type transmission 5 is in the neutral position. In step S2, if YES, that is, the gear type transmission 5 is in the neutral position, the routine is returned to step S1. If NO, that is, the gear type transmission 5 is in the forward position or the backward position, the routine is advanced to step S3.

In step S3, it is determined whether or not the vehicle speed V (main propeller shaft rotational speed PN) is equal to or less than the set vehicle speed V2 (set rotational speed PN2). If NO, that is, the vehicle speed V exceeds the set vehicle speed V2, the routine is returned to step S1. If YES, that is, the vehicle speed V is equal to or less than the set vehicle speed V2, the routine is advanced to step S4.

In step S4, it is determined whether or not the engine speed N exceeds the limit rotational speed N2. If NO, that is, the engine speed N does not exceed the limit rotational speed N2, the routine is returned to step S1. If YES, that is, the engine speed N exceeds the limit rotational speed N2, the routine is advanced to step S5 to count a continuation time (elapse time) in the state of the vehicle speed V0 to V1 and the routine is then advanced to step S6.

In step S6, it is determined whether or not the continuation time (elapse time) is equal to or more than a predetermined time. If NO, that is, the continuation time is less than the predetermined time, the routine is returned to step S2. If YES, that is, the continuation time is equal to or more than the predetermined time, the routine is advanced to step S7 to retard ignition timing of the ignition device 34 for reducing the engine speed N by a fixed rate and the routine is then advanced to step S8.

In step S8, it is determined whether the vehicle speed is equal to or less than the set vehicle speed V2. If NO, that is, the vehicle speed exceeds the set vehicle speed V2 after getting out of the stuck state, the routine is advanced to step S9 to increase the engine speed N by a fixed rate and the routine is then returned to step S1.

In step S8, if YES, that is, the vehicle does not get out of the stuck state and the vehicle speed is continued to be equal to or less than the set vehicle speed V2, the routine is advanced to step S10 to determine whether the engine speed N exceeds the limit rotational speed N2. If YES, that is, the engine speed N exceeds the limit rotational speed N2, the routine is returned to step S7 to decrease the engine speed N by a fixed rate again.

In step S10, if NO, that is, the vehicle speed does not exceed the limit rotational speed N2, the routine is advanced to step S9 to increase the engine speed by a fixed rate.

Second Embodiment

Figure 8:
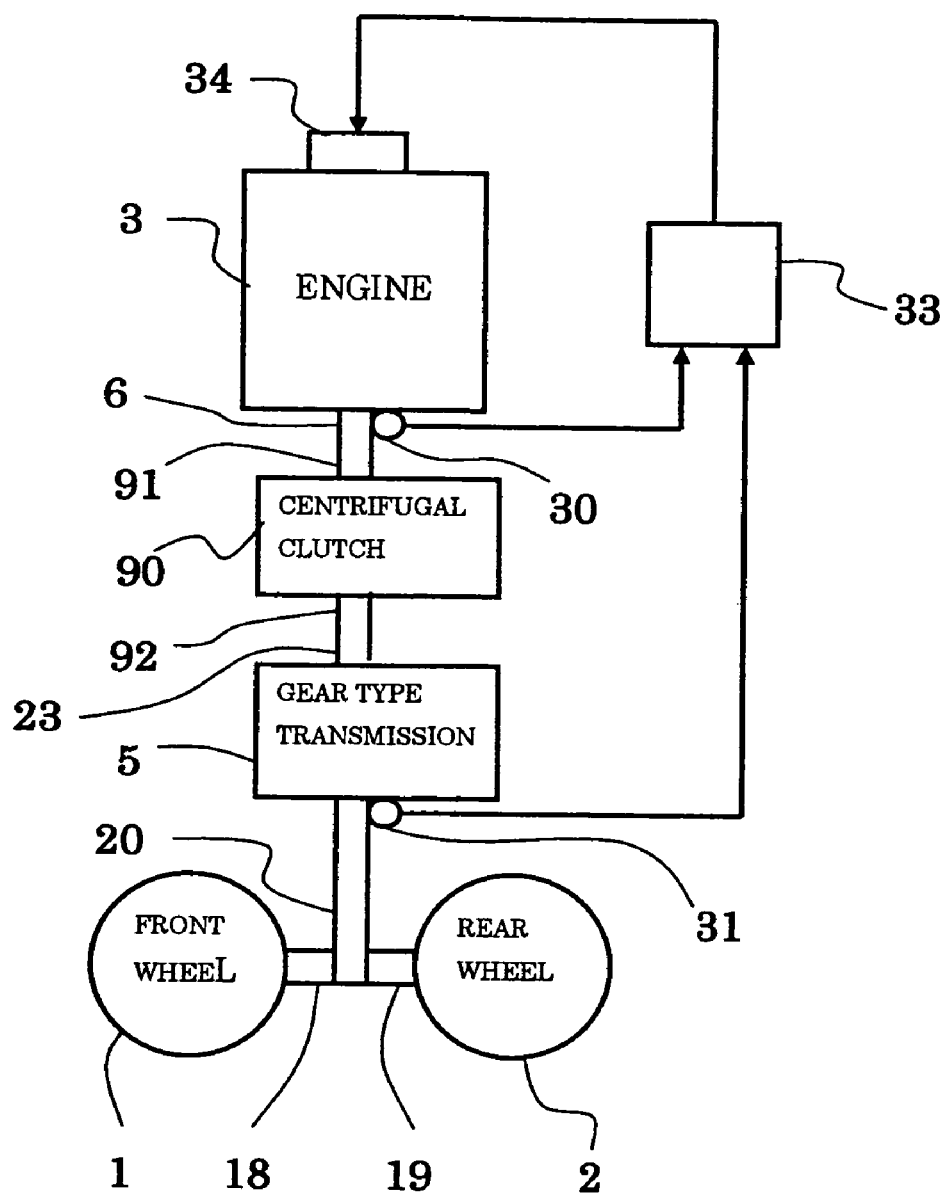
FIG. 8 is a block diagram showing a power transmission path of the straddle-type four wheeled vehicle for irregular ground according to a second embodiment of the present invention.

FIG. 8 is a block diagram showing the power transmission path according to a second embodiment of the present invention. The power transmission path has a centrifugal clutch device 90 as a clutch device which is changed from the partial clutch engagement state to the complete clutch connection state at a predetermined engage rotational speed with the increase of the engine speed. A clutch input shaft 91 is coupled to the crankshaft 6 of the engine 3. A clutch output section 92 is coupled to the transmission input shaft 23 of the gear type transmission 5. The configuration of the second embodiment other than the clutch device is the same as that of the first embodiment described with reference to FIG. 3. Similar parts are indicated by the same reference numerals.

Figure 9:
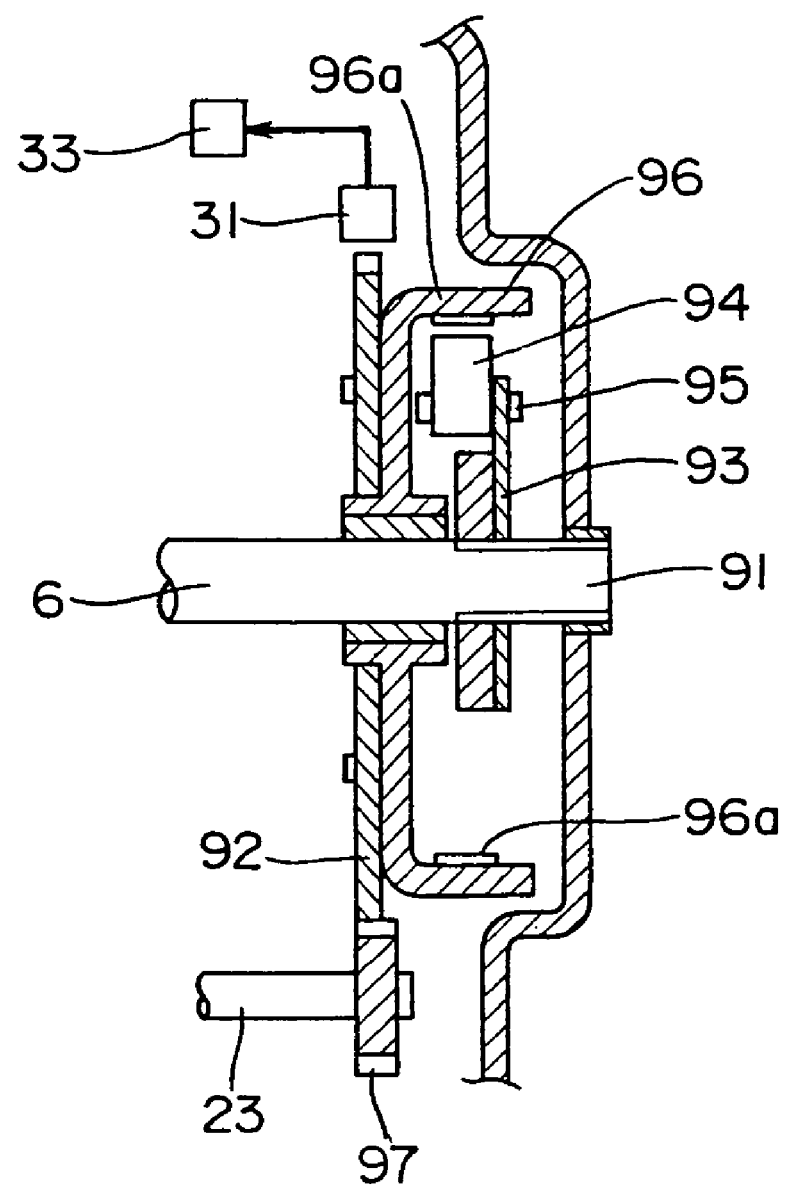
FIG. 9 is a cross-sectional view showing an example of a centrifugal clutch device used in the second embodiment of the present invention.

FIG. 9 is a cross-sectional schematic view showing an example of the centrifugal clutch device 90. A shoe holder 93 is fixed to the clutch input shaft 91 formed integrally with the crankshaft 6. A plurality of clutch shoes 94 having a fixed weight are arranged with spacing on the shoe holder 93 in the circumferential direction, are supported in a manner rotatable outward in the radial direction via a support shaft 95, and are biased to the axial side by a spring not shown. A clutch drum 96 having a friction surface 96a opposite the clutch shoes 94 from the outside in the radial direction is arranged, is rotatably supported by the clutch input shaft 91 via a bearing, and integrally has a gear 92 for output as the clutch output section. The gear 92 for output is engaged with a gear 97 of the transmission input shaft 23 of the gear type transmission 5. The power downstream side rotational speed detecting device 31 is arranged outward in the radial direction of the gear 92 for output and detects rotational speeds of the gear 92 for output.

The control of the engine speed and the advantageous according to the second embodiment are the same as those of the first embodiment and the description is not repeated.

In the second embodiment, when the vehicle is in the stuck state, the engine speed N is limited to or below the limit rotational speed N2. Burning in the friction causing section of the clutch shoes 94 and the friction surface 96a of the clutch drum 96 can therefore be prevented. At the same time, pulling force to escape the stuck state can be produced.

Third Embodiment

Figure 10:
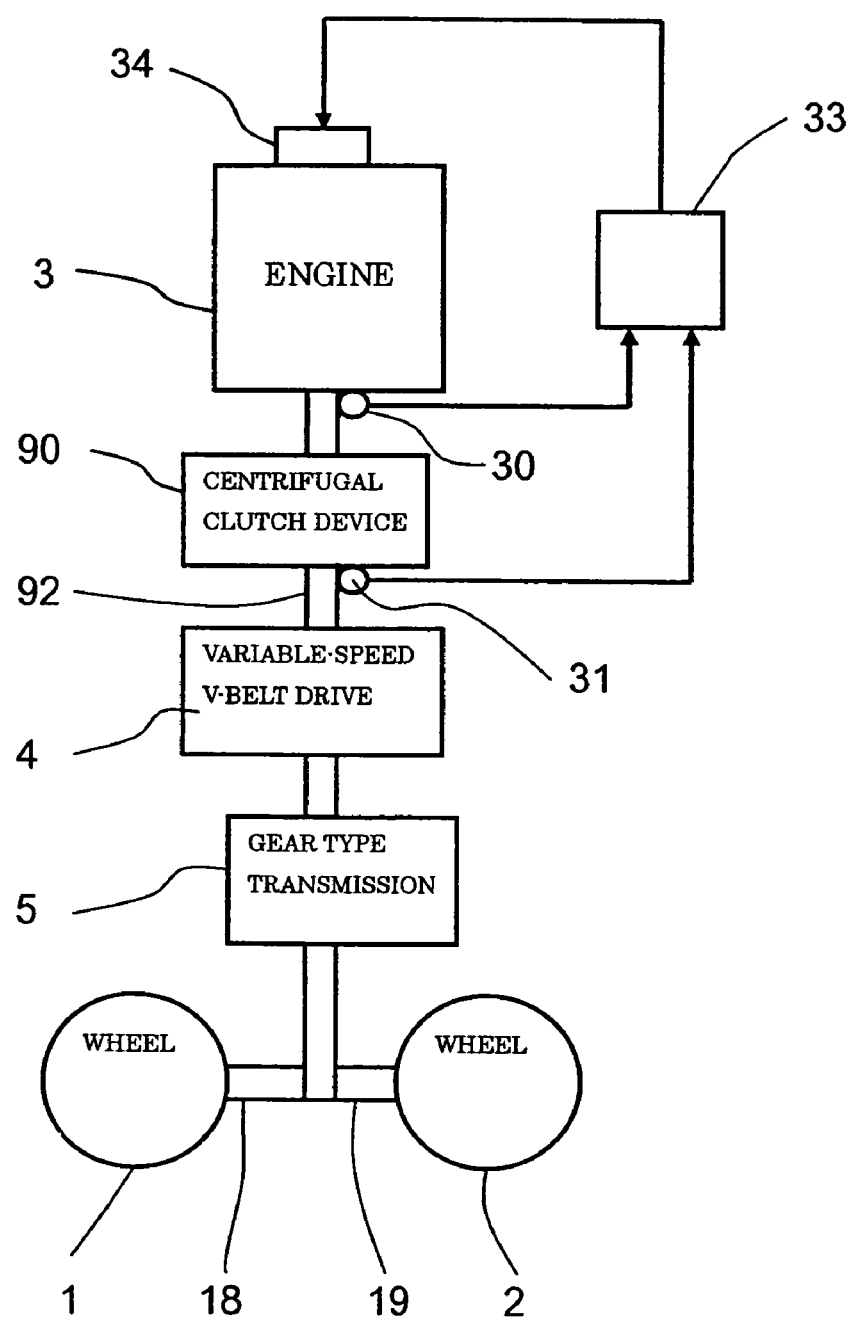
FIG. 10 is a block diagram showing a power transmission path of the straddle-type four wheeled vehicle for irregular ground according to a third embodiment of the present invention.

FIG. 10 is a block diagram showing a power transmission path according to a third embodiment of the present invention. The power transmission path from the engine 3 to the front wheel 1 and the rear wheel 2 has the centrifugal clutch device 90 of the same configuration as FIG. 9, the variable-speed V-belt drive 4, and the gear type transmission 5, in order from the engine side (power upstream side). The variable-speed V-belt drive 4 can be of a configuration with or without the clutch function.

The power downstream side rotational speed detecting device 31 is arranged on the output section 92 of the centrifugal clutch device 90 to detect rotational speeds of the output section 92a.

The third embodiment is the same as the first embodiment described with reference to FIG. 3 except that the centrifugal clutch device 90 and the variable-speed V-belt drive 4 are arranged between the engine 3 and the gear type transmission 5. Thus, similar parts are indicated by the same reference numerals.

The control of the engine speed and the advantageous according to the third embodiment are the same as those of the first and second embodiments and the description is not repeated.

In the third embodiment, when the vehicle is in the stuck state, the engine speed is limited to or below the limit rotational speed N2. Burning on the friction surface of the clutch shoes and the clutch drum in the centrifugal clutch device 90 can therefore be prevented. As described above, the engine speed is limited to or below the limit rotational speed N2, and therefore early wear on the V-belt of the variable-speed V-belt drive 4 arranged on the power downstream side of the centrifugal clutch device 90 can also be prevented.

Other Embodiments (1) In the first to third embodiments, in FIG. 6, the predetermined limit rotational speed N2 of the engine speed N is set in the range from the engage rotational speed Ne to the substantially maximum torque rotational speed Nmax. The present invention is not limited to the range. The limit rotational speed N2 may be set in a range from the engage rotational speed Ne to a maximum rotational speed N3 at acceleration higher than the substantially maximum torque rotational speed Nmax, for example.

(2) In the first to third embodiments, as in FIG. 3 and the like, the power downstream side rotational speed detecting device (vehicle speed detecting device) 31 detects the rotational speed of the main propeller shaft 20 as a value corresponding to a vehicle speed. The present invention is not limited to the above configuration. In FIG. 3, the power downstream side rotational speed detecting device (vehicle speed detecting device) 31 may detect rotational speeds of the rear wheel driving shaft 19, the rear wheels 2, the front wheel driving shaft 18, or the front wheels 1, for example. Moreover, in FIG. 5, the power downstream side rotational speed detecting device (vehicle speed detecting device) 31 may detect rotational speeds of the driven shaft 28 of the variable-speed V-belt drive 4, the transmission input shaft 23, the transmission output shaft 22, or the counter shaft 64 of the gear type transmission 5, as a value corresponding to a vehicle speed.

(3) As the engine speed changing means, the ignition device 34 is used in the above embodiments. A fuel injector or a throttle device may be used as the engine speed changing means. When the fuel injector is used, the engine speed may be decreased by reducing the injection quantity. When the throttle device is used, the engine speed may be decreased by reducing the throttle opening. Other typical speed reducing means may also be used.

(4) The first embodiment is applied to the four-wheel-drive vehicle. The present invention may be also applicable to a rear-wheel-drive four wheeled vehicle, a front-wheel-drive four wheeled vehicle, or a four-wheel-drive vehicle which can be switched between two-wheel-drive and four-wheel-drive. When the present invention is applied to the rear-wheel-drive vehicle or the front-wheel-drive vehicle, the power downstream side rotational speed detecting device may be arranged so as to detect rotational speeds of the rotating member in the power transmission path from the power intermittent section of the clutch device to the rear wheels as driving wheels or rotational speeds of the rotating member in the power transmission path from the power intermittent section of the clutch device to the front wheels as driving wheels. In the four-wheel-drive vehicle which can be switched between two-wheel-drive and four-wheel-drive, the power downstream side rotational speed detecting device 31 may be arranged so as to detect rotational speeds of the rotating member in the power transmission path up to the rear wheels which are operated as driving wheels at all times, for example. Moreover, the present invention can be applied to such a four-wheel-drive vehicle without a gear type transmission.

(5) The present invention is not limited to the configuration of the above embodiments and various modifications conceivable in the scope without departing from the contents described in the claims are included. The present invention is also applicable to a seating-type four wheeled working vehicle for irregular ground, a three wheeled vehicle or motorcycle for irregular ground in addition to the straddle-type four wheeled vehicle for irregular ground.

What is claimed is:

1. A vehicle comprising:
    a clutch device arranged in a power transmission path between an engine and wheels and which changes from a partial clutch engagement state to a complete connection state when an engine speed is increased to a predetermined engage rotational speed of the clutch device;
    first detecting means for detecting the engine speed;
    second detecting means for detecting a rotational speed of a rotating member arranged on the power transmission path on a power downstream side from a power intermittent section of the clutch device and rotated by output power of the clutch device;
    engine speed changing means for changing the engine speed; and
    control means for controlling the engine speed changing means such that the engine speed does not exceed a limit rotational speed when the rotational speed of the rotating member detected by the second detecting means is lower than a set rotational speed and the engine speed detected by the first detecting means exceeds the limit rotational speed, the set rotational speed of the rotating member being set in a range from zero to a rotational speed of the rotating member during rotation of the engine at the predetermined engage rotational speed, and the limit rotational speed of engine being set in a range between a speed more than the predetermined engage rotational speed and a speed less than a predetermined maximum limit rotational speed.

2. The vehicle of claim 1, wherein the predetermined maximum limit rotational speed is a substantially maximum torque rotational speed.

3. The vehicle of claim 1, wherein the control means controls the engine speed changing means, after a state in which the rotating member has rotated at a speed lower than the set rotational speed or stopped has continued for a predetermined time, such that the engine speed does not exceed the limit rotational speed.

4. The vehicle of claim 1, wherein the clutch device is a variable-speed V-belt drive having a clutch function.

5. The vehicle of claim 1, wherein the clutch device is a centrifugal clutch device.

6. The vehicle of claim 1, wherein the control means controls the engine speed changing means such that the engine speed is decreased by a fixed rate when the engine speed exceeds the limit rotational speed, and then when the rotational speed of the rotating member detected by the second detecting means exceeds the set rotational speed, the engine speed is increased by a fixed rate.

7. A four wheeled vehicle for irregular ground comprising the configuration of the vehicle of claim 1.

8. The four wheeled vehicle of claim 7, capable of being driven in four-wheel-drive.

9. The four wheeled vehicle of claim 8, wherein the rotating member transmits a force of the engine to both front and rear wheels arranged on the power transmission path.

10. The four wheeled vehicle of claim 7, further comprising a gear type transmission, the gear type transmission in a neutral state allowing the engine speed to exceed the limit rotational speed.

11. The four wheeled vehicle of claim 7, wherein the engine speed changing means is an ignition device for changing the engine speed by retarding ignition timing.

12. The vehicle of claim 1, wherein the control means is electrically connected to the first detecting means, the second detecting means, and the engine speed changing means.

13. A vehicle comprising:
- a clutch device arranged in a power transmission path between an engine and wheels and which changes from a partial clutch engagement state to a complete connection state when an engine speed is increased to a predetermined engage rotational speed of the clutch device;
- first detecting means for detecting the engine speed;
- second detecting means for detecting a rotational speed of a rotating member arranged on the power transmission path on a power downstream side from a power intermittent section of the clutch device and rotated by output power of the clutch device;
- engine speed changing means for changing the engine speed; and
- control means for controlling the engine speed changing means such that the engine speed is decreased when the rotational speed of the rotating member detected by the second detecting means is lower than a set rotational speed and the engine speed detected by the first detecting means exceeds the limit rotational speed for a predetermined time, the set rotational speed of the rotating member being set in a range from zero to a rotational speed of the rotating member during rotation of the engine at the predetermined engage rotational speed, and the limit rotational speed of engine being set in a range between a speed more than the predetermined engage rotational speed and a speed less than a predetermined maximum limit rotational speed.

14. The vehicle of claim 13, wherein, after the decrease of the engine speed, the control means controls the engine speed changing means such that engine speed is increased when the rotational speed of the rotating member detected by the second detecting means exceeds the set rotational speed.

15. The vehicle of claim 13, wherein the predetermined maximum limit rotational speed is a substantially maximum torque rotational speed.

16. A four wheeled vehicle for irregular ground comprising the configuration of the vehicle of claim 13.

17. The four wheeled vehicle of claim 16, capable of being driven in four-wheel-drive.

18. The four wheeled vehicle of claim 17, wherein the rotating member transmits a force of the engine to both front and rear wheels arranged on the power transmission path.

19. The four wheeled vehicle of claim 16, further comprising a gear type transmission, the gear type transmission in a neutral state allowing the engine speed to exceed the limit rotational speed.

20. The four wheeled vehicle of claim 16, wherein the engine speed changing means is an ignition device for changing the engine speed by retarding ignition timing.

* * * * *